United States Patent
Yoo et al.

(10) Patent No.: US 11,842,276 B2
(45) Date of Patent: Dec. 12, 2023

(54) DISPLAY DEVICE INCLUDING A LIGHT-EMITTING MODE AND A NEURAL NETWORK MODE

(71) Applicant: SAMSUNG DISPLAY CO., LTD., Yongin-si (KR)

(72) Inventors: Young Wook Yoo, Yongin-si (KR); Hyeon Min Kim, Yongin-si (KR); Jun Gyu Lee, Yongin-si (KR); Hyun Jun Lim, Yongin-si (KR); Byung Ki Chun, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/340,402

(22) Filed: Jun. 7, 2021

(65) Prior Publication Data
US 2022/0067515 A1 Mar. 3, 2022

(30) Foreign Application Priority Data

Aug. 26, 2020 (KR) .......................... 10-2020-0108135

(51) Int. Cl.
*G06N 3/08* (2023.01)
*G06N 3/067* (2006.01)
(Continued)

(52) U.S. Cl.
CPC ............. *G06N 3/08* (2013.01); *G06N 3/0675* (2013.01); *G09G 3/3241* (2013.01);
(Continued)

(58) Field of Classification Search
None
See application file for complete search history.

(56) References Cited

U.S. PATENT DOCUMENTS

| 2003/0177450 A1* | 9/2003 | Nugent | G06N 3/063 706/15 |
| 2011/0007067 A1* | 1/2011 | Ryu | G09G 3/3233 345/76 |

(Continued)

FOREIGN PATENT DOCUMENTS

| CN | 109872691 A | * 6/2019 | ............. G09G 3/006 |
| CN | 110322853 A | * 10/2019 | ........... G09G 3/3607 |

(Continued)

OTHER PUBLICATIONS

Ankit et al., "TraNNsformer: Neural Network Transformation for Memristive Crossbar based Neuromorphic System Design", 2017 IEEE/ACM International Conference on Computer-Aided Design (ICCAD), arXiv:1708.07949v2 [cs.ET] Mar. 4, 2018, 8 pages.

*Primary Examiner* — Kirk W Hermann
(74) *Attorney, Agent, or Firm* — F. CHAU & ASSOCIATES, LLC

(57) ABSTRACT

The display device includes a plurality of pixels, a data driver, and a timing controller. The plurality of pixels are connected to a plurality of scan lines and a plurality of data lines. The data driver supplies a data voltage to the plurality of data lines in a light-emitting mode and supplies a neural network input voltage to the plurality of data lines in an artificial neural network mode. The timing controller is in an artificial neural network mode, and supplies a weight value control signal for performing a deep learning operation by using at least one of the plurality of pixels to the data driver. The weight value control signal is generated based on a predetermined weight value.

17 Claims, 10 Drawing Sheets

(51) Int. Cl.
  *G09G 3/3258*    (2016.01)
  *G09G 3/3283*    (2016.01)
  *G09G 3/36*      (2006.01)
  *G09G 3/3241*    (2016.01)

(52) U.S. Cl.
  CPC ......... *G09G 3/3258* (2013.01); *G09G 3/3283* (2013.01); *G09G 3/3696* (2013.01); *G09G 2300/0866* (2013.01)

(56) References Cited

U.S. PATENT DOCUMENTS

| | | | | |
|---|---|---|---|---|
| 2014/0111567 | A1* | 4/2014 | Nathan | G09G 3/3241 |
| | | | | 345/694 |
| 2018/0211620 | A1* | 7/2018 | Kurokawa | H01L 27/1225 |
| 2020/0098304 | A1* | 3/2020 | Hou | G06K 9/627 |
| 2020/0193928 | A1* | 6/2020 | Kawashima | H01L 27/1225 |
| 2020/0373430 | A1* | 11/2020 | Shima | H01L 29/66969 |
| 2021/0374908 | A1* | 12/2021 | Lin | G06T 3/4046 |
| 2022/0319443 | A1* | 10/2022 | Hiramatsu | G09G 3/3426 |

FOREIGN PATENT DOCUMENTS

| | | | |
|---|---|---|---|
| JP | 2018194719 A | * | 12/2018 |
| KR | 10-2019-0021756 | | 3/2019 |
| KR | 20210158566 A | * | 12/2021 |
| TW | 202036522 A | * | 10/2020 |

* cited by examiner $a = x_1w_1 + x_2w_2 + b$

DISPLAY DEVICE INCLUDING A LIGHT-EMITTING MODE AND A NEURAL NETWORK MODE

CROSS-REFERENCE TO RELATED APPLICATION

This application claims priority to and the benefit of Korean Patent Application No. 10-2020-0108135 filed in the Korean Intellectual Property Office on Aug. 26, 2020, the entire contents of which are incorporated by reference herein in their entirety.

TECHNICAL FIELD

The present disclosure relates to a display device.

DESCRIPTION OF THE RELATED ART

Electronic devices such as televisions, mobile phones, computers, tablets, etc. may include a display device (e.g., a display unit, a display panel) to convey visual information to a user such as text information, video information, picture information, two-dimensional or three-dimensional images, or the like. For instance, a display device may include a multitude of light-emitting pixels. A display may be a self-luminescent display panel such as an Organic Light-emitting Display panel (OLED panel), or a non-self-luminescent display panel such as a Liquid Crystal Display panel (LCD panel).

A display device has advantages as the thickness of the device is decreased, such as material cost and user convenience. However, in some cases, when a pixel does not emit light, a constituent element may be added, which adds thickness and manufacturing cost to the device. Implementations to reduce manufacturing cost and produce a slimmer display device may be desired.

SUMMARY

The present disclosure is to provide a display device that may perform an operation through deep learning inference.

An embodiment of the present disclosure provides a display device including: a plurality of pixels connected to a plurality of scan lines and a plurality of data lines; a data driver configured to supply a data voltage to the plurality of data lines in a light-emitting mode and supply a neural network input voltage to the plurality of data lines in an artificial neural network mode; and a timing controller configured to supply a weight value control signal to the data driver in the artificial neural network mode, wherein the weight value control signal is generated based on (e.g., by representing) a predetermined weight value for performing a deep learning operation using at least one of the plurality of pixels.

The neural network input voltage is generated based on the weight value control signal and the data driver provides the neural network input voltage to the plurality of data lines.

The plurality of pixels may include a plurality of first pixels and a plurality of second pixels; the plurality of first pixels may emit light in the light-emitting mode and the plurality of second pixels may emit light in the light-emitting mode; and the plurality of second pixels may perform the deep learning operation in the artificial neural network mode.

The plurality of first pixels may not emit light in the artificial neural network mode and the plurality of second pixels may not emit light in the artificial neural network mode.

The display device may further include an active circuit connected to the plurality of second pixels, wherein the active circuit may receive an active current corresponding to the deep learning operation from the plurality of second pixels connected to the active circuit, and the active circuit may supply a neural network output voltage corresponding to the active current to the timing controller.

The timing controller may generate the weight value control signal by representing the predetermined weight value to the neural network output voltage.

At least one active circuit is be disposed per each pixel row in which the plurality of second pixels are disposed.

The active circuit may be a current mirror circuit.

Another embodiment provides a display device including: a display unit that includes a plurality of first pixels connected to a first plurality of scan lines and a plurality of data lines; a plurality of second pixels connected to a second plurality of scan lines, a plurality of data lines, a plurality of light-emitting control lines, and a plurality of neural network lines; and an active circuit connected to the plurality of second pixels; a scan driver providing a scan signal to the first plurality of scan lines and the second plurality of scan lines; a neural network driver providing a neural network control signal to the plurality of neural network lines; a data driver providing a data voltage or a neural network input voltage to the plurality of data lines and the plurality of data lines; and a timing controller providing a control signal driving each of the scan driver, the neural network driver, and the data driver, wherein the timing controller may provide a weight value control signal generated by representing a weight value to the data driver, where the weight value is based on a neural network output voltage received from the active circuit and the data driver may provide the neural network input voltage to the plurality of data lines, where the neural network input voltage is generated based on the weight value control signal.

The display unit may be driven in a light-emitting mode in which light-emitting elements of the plurality of first pixels emit light and light-emitting pixels of the plurality of second pixels emit light, and in an artificial neural network mode in which the light-emitting elements of the plurality of first pixels do not emit light and the light-emitting elements of the plurality of second pixels do not emit light.

Each of the plurality of first pixels may include a first transistor that includes a first electrode connected to a first power source, a second electrode connected to an anode of the light-emitting element, and a gate electrode; a second transistor that includes a first electrode connected to the data line, a second electrode connected to the gate electrode of the first transistor, and a gate electrode connected to the scan line; and the light-emitting element connected to the first transistor.

The display device may further include a light-emitting control driver sequentially providing a light-emitting control signal to a plurality of light-emitting control lines, wherein the plurality of second pixels may be each connected to the plurality of light-emitting control lines.

Each of the plurality of second pixels may include a first transistor that includes a first electrode connected to a first power source, a second electrode connected to a first node, and a gate electrode; a second transistor that includes a first electrode connected to the data line, a second electrode connected to the gate electrode of the first transistor, and a gate electrode connected to the scan line; a third transistor that includes a first electrode connected to the first node, a second electrode connected to anode of a light-emitting element, and a gate electrode connected to a light-emitting control line; a fourth transistor that includes a first electrode connected to the first node, a second electrode connected to a second node, and a gate electrode connected to a neural network control line; and the light-emitting element connected to the third transistor.

When the display unit is in the light-emitting mode, the second transistor may transmit the data voltage to the first transistor in response to the scan signal, the first transistor may control a driving current flowing into the light-emitting element through the third transistor in response to the data voltage, and the light-emitting element may emit light in response to the driving current supplied through the third transistor.

When the display unit is in the artificial neural network mode, the second transistor may transmit the neural network input voltage to the first transistor in response to the scan signal, the first transistor may control a first node current applied to the first node in response to the neural network input voltage, and the fourth transistor may output an active current corresponding to the first node current to the second node.

The active circuit may be connected between the second node and an output terminal, and the output terminal may be connected to the timing controller through the neural network output line to transmit the neural network output voltage to the timing controller.

The active circuit may be a current mirror circuit.

The active circuit may be connected to at least one of the plurality of second circuits based on the second node, the active current corresponds to at least one of the plurality of second circuits, and the active current may be applied to the second node.

Another embodiment provides a display device including: a display unit that includes a plurality of pixels connected to a plurality of scan lines, a plurality of data lines, a plurality of light-emitting control lines, and a plurality of neural network lines, and an active circuit connected to the plurality of pixels; a scan driver sequentially providing a scan signal to the plurality of scan lines; a light-emitting control driver sequentially providing a light-emitting control signal to the plurality of light-emitting control lines; a neural network driver sequentially providing a neural network control signal to the plurality of neural network lines; a data driver sequentially providing a data voltage or a neural network input voltage to the plurality of data lines; and a timing controller providing a control signal to drive each of the scan driver, the light-emitting control driver, the neural network driver, and the data driver, wherein the timing controller may provide a weight value control signal generated by representing a weight value based on a neural network output voltage received from the active circuit to the data driver, and the data driver may provide the neural network input voltage to the plurality of data lines, where the neural network input voltage is generated based on the weight value control signal.

The display unit may be driven in a light-emitting mode in which light-emitting elements of the plurality of pixels emit light, and the display unit may be driven in an artificial neural network mode in which the light-emitting elements of the plurality of pixels do not emit light.

According to the embodiment, when a pixel does not emit light, an operation through deep learning inference without adding a constituent element may be performed, by using the pixels as a network of an artificial neural network. Therefore, a reduction in manufacturing cost of a display device may occur and a slimmer display device may be produced.

Effects of the embodiment are not limited by what is illustrated in the above, and more various effects are included in the present specification.

DETAILED DESCRIPTION OF THE EMBODIMENTS

Figure 1:
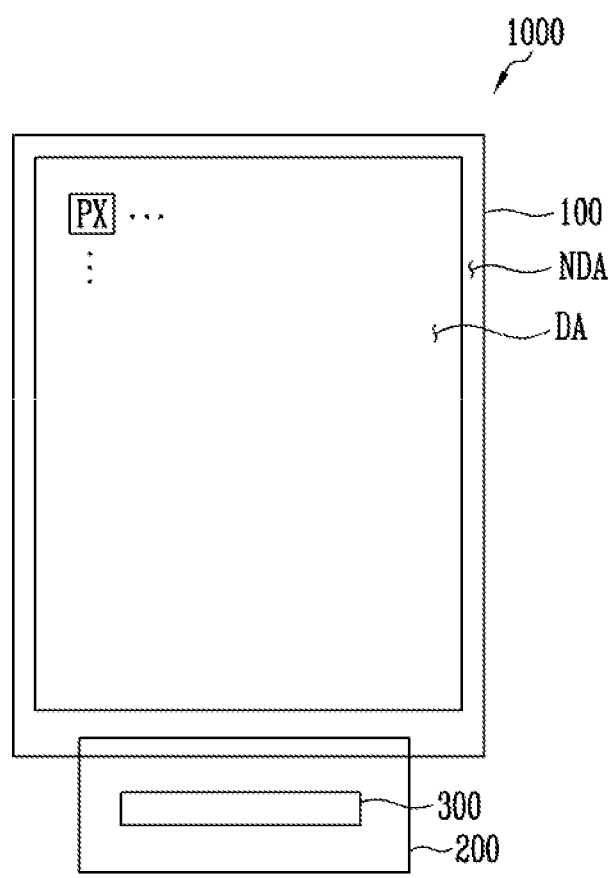
FIG. 1 illustrates a schematic plan view of a display device according to an embodiment.

The present disclosure relates generally to a display device. Electronic devices such as televisions, mobile phones, computers, tablets, etc. may include a display (e.g., a display unit, a display panel) to convey visual information to a user such as text information, video information, picture information, two-dimensional or three-dimensional images, or the like.

More particularly, embodiments of the present disclosure provide a display device with an artificial neural network, where weight and input values of the front end are input to pixel data lines to perform calculations (e.g., such as artificial neural network operations).

According to the techniques described herein, a display device may operate in a light-emitting mode and an artificial neural network mode. In the light-emitting mode, pixels of the displace device may be driven such that emit light. In the artificial neural network mode, neural network control signals may be applied to at least some of the pixels of the display device (e.g., and the pixels may not emit light). Accordingly, in the artificial neural network mode (e.g., when pixels do not emit light), operations through deep learning inference may be performed by using the pixels as an artificial neural network. Further, such operations may be performed without adding constituent elements. Therefore, a reduction in manufacturing cost of a display device may occur and a slimmer display device may be produced (e.g., alternative to other methods, where a constituent element may be added when a pixel does not emit light, which adds thickness to the device and adding manufacturing cost).

The display device of the present disclosure includes a plurality of pixels, a data driver, and a timing controller. The plurality of pixels are connected to a plurality of scan lines and a plurality of data lines. The data driver supplies a data voltage to the plurality of data lines in a light-emitting mode and supplies a neural network input voltage to the plurality of data lines in an artificial neural network mode. The timing controller is in an artificial neural network mode and supplies a weight value control signal for performing a deep learning operation by using at least one of the plurality of pixels to the data driver. The weight value control signal is generated by representing a predetermined weight value. In some embodiments, the weight value may be based on characteristic data of the display panel, logo compensation data, after-image compensation data, and external compensation, among other examples.

Since the present disclosure may be variously modified and have various forms, embodiments will be illustrated and described in detail in the following. However, the present disclosure is not restricted to the specific embodiments, and it is to be understood as embracing all methods included in the spirit and scope of any changes, equivalents, and substitutes.

Terms such as first, second, and the like will be used to describe various constituent elements and are not to be interpreted as limiting these constituent elements. The terms are used to differentiate one constituent element from other constituent elements. For example, a first constituent element could be termed a second constituent element, and similarly, a second constituent element could be termed as a first constituent element without departing from the scope of the present disclosure. Singular forms are intended to include plural forms unless the context clearly indicates otherwise.

In the present application, the term "include", "comprise", "have", or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Additionally, when an element such as a layer, film, region, or substrate is referred to as being "on" another element, the element can be directly on the other element or intervening elements may also be present. Additionally, or alternatively, in the present specification, when a portion of a layer, film, region, area, plate, or the like is referred to as being formed "on" another portion, the formed direction is not limited to an upper direction but includes a lateral or lower direction. In contrast, when a portion of a layer, film, region, plate, or the like is referred to as being "below" another portion, the portion may be directly below the other portion, or intervening portions may be present.

In the present specification, the term "connection" may include an electrical connection and a physical connection. Additionally, the term "connection" may include a direct connection and/or an indirect connection through another constituent element.

Hereinafter, a display device, according to an embodiment of the present disclosure, will be described with reference to drawings related to the embodiment of the present disclosure.

FIG. 1 illustrates a schematic plan view of a display device according to an embodiment.

Referring to FIG. 1, a display device 1000 according to an embodiment may include a display panel 100, a connection film 200, and a driving chip 300.

In the embodiment, the display device 1000 may be a flat panel display device implemented as a liquid crystal display or light-emitting display device, a flexible display device, a curved display device, a foldable display device, and a bendable display device. Additionally, or alternatively, the display device may be applied to a transparent display device, a head-mounted display device, a wearable display device, and the like.

In some examples, a display device 1000 may include or refer to a user interface that may enable a user to interact with a device (e.g., an electronic device). In some embodiments, the user interface may include a display screen, or an input device (e.g., remote control device interfaced with the user interface directly or through an input/output (I/O) controller module). In some cases, an I/O controller may be implemented as part of a processor. In some cases, a user may interact with a device via IO controller or via hardware components controlled by an I/O controller. In some cases, a user interface may be a graphical user interface (GUI). In some examples, a fingerprint sensor may be used to provide a secure process to access the display device. In some cases, a finger print sensor may include a touch-screen digitizer overlaid onto the display that can sense touch and interact with the display.

The display panel 100 includes a display area DA and a non-display area NDA. The display area DA is an area that displays an image by including a plurality of pixels PX, and the non-display area NDA is an area in which an image is not displayed, excluding the display area DA. The non-display area NDA may be a bezel area surrounding the display area DA.

The non-display area NDA is disposed around the display area DA to surround the display area DA, and may selectively include wires, pads, driving circuits, etc. connected to the pixels PX of the display area DA. For example, in the non-display area NDA, a scan line, a data line, a driving voltage line, and a driving low voltage line may be disposed to be connected to the plurality of pixels PX.

The connection film 200 is disposed at one side of the display panel 100. In the embodiment, the connection film 200 may be disposed under the non-display area NDA of the display panel 100, but the present disclosure is not limited thereto.

The driving chip 300 for driving the plurality of pixels PX is disposed on the connection film 200. The driving chip 300 may include a scan driver (310 in FIG. 2) for applying a scan signal to the plurality of pixels PX, a light-emitting control driver (320 in FIG. 2) for applying a light-emitting control signal thereto, and a neural network driver (330 in FIG. 2), a data driver (340 in FIG. 2) for applying a data voltage thereto, and a timing controller (350 in FIG. 2). However, the present disclosure is not limited thereto.

The connection film 200 may connect the display panel 100 and a flexible printed circuit board (FPCB). In some embodiments, the connection film 200 may be implemented as various configurations such as a chip on film, a chip on glass, a chip on plastic, and a tape carrier package.

Additionally, or alternatively, in some embodiments, the above-described scan driver (310 in FIG. 2), light-emitting control driver (320 in FIG. 2), neural network driver (330 in FIG. 2), data driver (340 in FIG. 2), and timing controller (350 in FIG. 2) may be included in a separate integrated circuit chip (IC Chip) mounted on a flexible printed circuit board.

In some examples, display panel 100 may be coupled with a processor which may analyze and generate signals for driving aspects of the display panel 100. For instance, A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to execute computer-readable instructions stored in a memory to perform various functions (e.g., such as analyze reflected ultrasonic signals, compare fingerprints, perform device unlocking operations, etc.). In some embodiments, a processor includes special purpose components for modem processing, baseband processing, digital signal processing, or transmission processing.

Hereinafter, a configuration capable of driving a pixel of a display device will be described with reference to FIG. 2 and FIG. 3.

Figure 2:
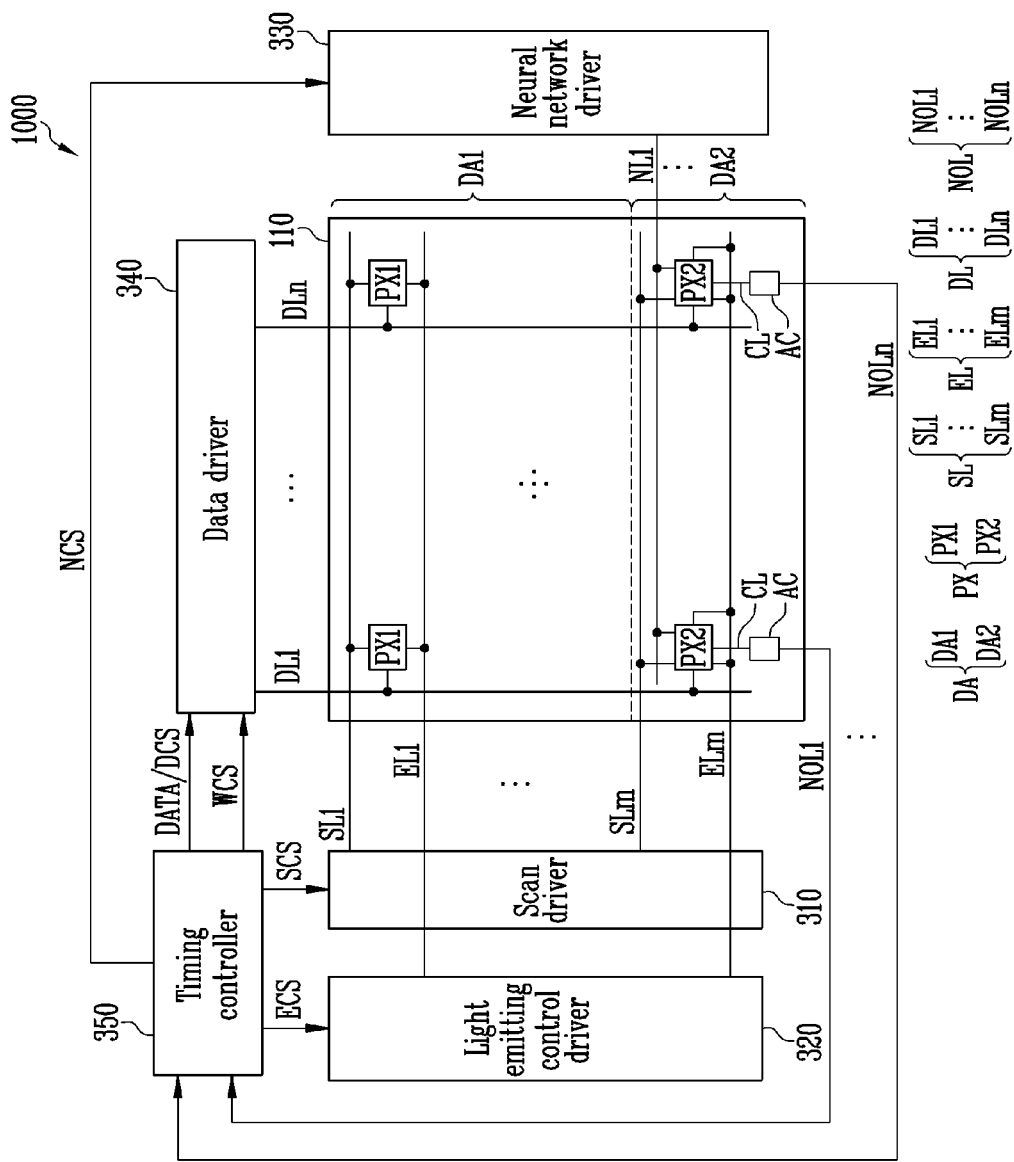
FIG. 2 and FIG. 3 illustrate schematic block diagrams of a display device according to an embodiment.
Figure 3:
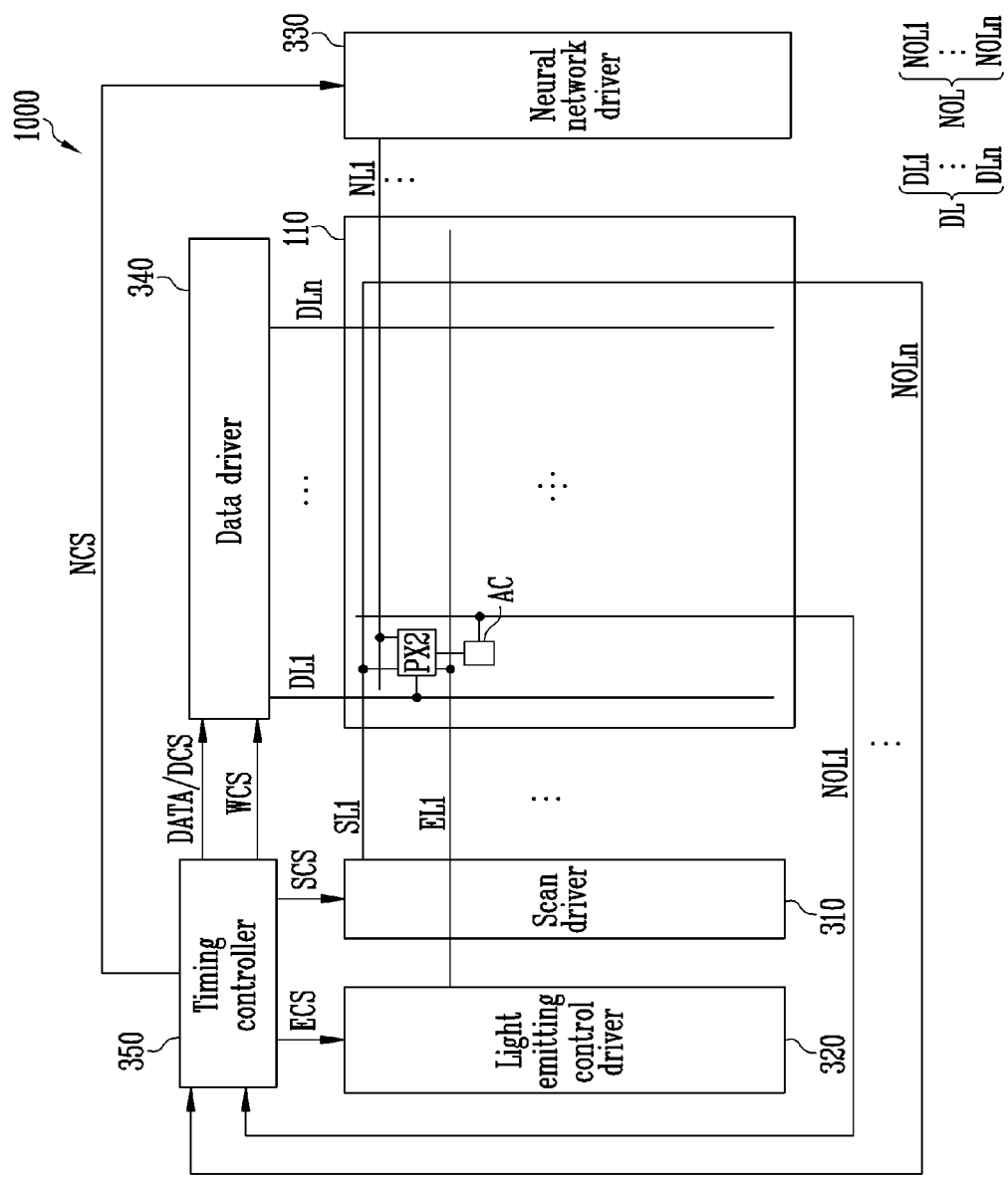

FIG. 2 and FIG. 3 illustrate schematic block diagrams of a display device according to an embodiment.

Referring to FIG. 2 and FIG. 3, the display device 1000 according to the embodiment may include a display portion 110, the scan driver 310, the light-emitting control driver 320, the neural network driver 330, the data driver 340, and the timing controller 350.

The display portion 110 may be formed in a predetermined display panel 100, and may correspond to the display area DA of FIG. 1.

The display portion 110 includes a plurality of scan lines SL comprising scan lines SL1 to SLm, a plurality of light-emitting control lines EL comprising light-emitting control lines EL1 to ELm, a plurality of neural network control lines NL comprising a neural network control line NL1, a plurality of data lines DL comprising data lines DL1 to DLn, a plurality of connection lines CL, and a plurality of neural network output lines NOL comprising neural network output lines NOL1 to NOLn. Additionally, or alternatively, the display portion 110 may include the pixel PX connected to at least one of the plurality of scan lines SL, the plurality of light-emitting control lines EL, the plurality of neural network control lines NL, and the plurality of data lines DL.

The plurality of pixels PX may include a plurality of first pixels PX1 and a plurality of second pixels PX2 classified according to a line connected thereto. The plurality of first pixels PX1 may be connected to the plurality of scan line SL, the plurality of light-emitting control line EL, and the plurality of data line DL, respectively, and the plurality of second pixels PX2 may be connected to the plurality of scan lines SL, the plurality of data lines DL, the plurality of light-emitting control lines EL, the plurality of neural network control lines NL and the plurality of connection lines CL, respectively.

In the embodiment, referring to FIG. 2, the display portion 110 may include a first area DA1 in which the plurality of first pixels PX1 are disposed and a second area DA2 in which the plurality of second pixels PX2 and an active circuit AC are disposed. In some embodiments, the active circuit AC may be disposed in the non-display area NDA of the display panel 100.

Additionally, or alternatively, in some embodiments, as shown in FIG. 3, the plurality of second pixels PX2 and the active circuit (AC) may be entirely disposed in the display portion 110.

The first pixel PX1 and the second pixel PX2 may include a light-emitting element (LD of FIG. 4 and FIG. 5), at least one transistor to provide or for providing a driving current to the light-emitting element LD, and a capacitor. Accordingly, the first pixel PX1 and the second pixel PX2 may emit light with a luminance corresponding to a data voltage (or data signal) provided through the data line DL in response to a scan signal provided through the scan line SL. For example, a pixel positioned at an i-th row and a j-th column may respond to a scan signal provided through an i-th scan line to emit light with a luminance corresponding to a data voltage provided through a j-th data line. The second pixel PX2 further includes a neural network transistor, and may perform a deep learning operation. A specific configuration of the second pixel PX2 will be described in detail in FIG. 4 and FIG. 5 below.

The display portion 110 may be driven in a light-emitting mode in which the light-emitting elements (LD in FIG. 4 and FIG. 5) of the plurality of first pixels PX1 and the plurality of second pixels PX2 emit light in the first area DA1 and the second area DA2, and may be driven in an artificial neural network mode in which the light-emitting elements LD of the plurality of first pixels PX1 and the plurality of second pixels PX2 do not emit light. The display portion 110 may be operated in an artificial neural network mode during a period in which the light-emitting element LD is turned off or between light-emitting periods.

In the light-emitting mode, a scan signal, a data voltage, and a light-emitting control signal are applied to the plurality of first pixels PX1 and the plurality of second pixels PX2, so that the light-emitting elements LD of the first pixels PX1 and second pixels PX2 may emit light at a predetermined luminance corresponding to the data voltage.

In the artificial neural network mode, a neural network control signal is applied to the plurality of second pixels PX2, so that a neural network transistor of the second pixels PX2 is operated, and may generate a neural network output voltage (or neural network output signal) corresponding to a neural network input voltage (or neural network input signal) together with the active circuit AC connected to the neural network transistor. Accordingly, in the display device, according to the embodiment, when a pixel does not emit light, an operation through deep learning inference without adding a constituent element may be performed by using the pixels as a network of an artificial neural network. Therefore, a reduction in manufacturing cost of a display device may occur and a slimmer display device may be produced. Operations of the second pixel PX2 and the active circuit AC in the artificial neural network mode are described in more detail herein (e.g., with reference to FIG. 11 and FIG. 12).

The scan driver 310 may generate a scan signal based on a first control signal SCS, and may sequentially provide the scan signals to the scan lines SL. When the scan signals are sequentially applied, the pixels PX may be selected in horizontal line units (or pixel row units). Here, the first control signal SCS may include a scan start signal (or scan start pulse), a scan clock signal, etc. The first control signal SCS may be provided from the timing controller 350.

The light-emitting control driver 320 may generate a light-emitting control signal based on a second control signal ECS and may sequentially provide the light-emitting control signals to the light-emitting control lines EL. In this case, the light-emitting control signal may have a voltage level at which a transistor supplied with the light-emitting control signal may be turned off.

The neural network driver 330 may provide neural network control signals (or neural network control voltages) to the neural network control lines NL based on a neural network driving control signal NCS. In this case, the neural network control signal may have a voltage level at which the neural network transistor may be turned on. An operation of the neural network transistor is described in more detail herein.

A neural network is a type of computer algorithm, implementable via neural network driver 330, that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs.

The data driver 340 may generate data voltages (or data signals) based on image data DATA and a third control signal DCS provided from the timing controller 350 in the light-emitting mode, and may provide the data voltages to the data lines DL. The data voltage provided by the data lines DL may be supplied to the pixels PX selected by the scan signal. Accordingly, the data driver 340 may supply a data voltage to the data lines DL to be synchronized with a scan signal. Here, the third control signal DCS is a signal for controlling an operation of the data driver 340, and may include a load signal (or data enable signal) indicating an output of an effective data voltage.

In the artificial neural network mode, the data driver 340 may generate a neural network input voltage (or neural network input signal) based on a weight value control signal WCS representing a weight value provided from the timing controller 350, and may provide the generated neural network input voltage to the data lines DL. Here, the weight value may be a weight value according to characteristic data of the display panel, logo compensation data, after-image compensation data, and external compensation.

The timing controller 350 may receive input image data and a control signal from the outside (for example, a graphic processor), and may generate the first control signal SCS, the second control signal ECS, the third control signal DCS, the neural network driving control signal NCS, and the weight value control signal WCS, based on the control signal. Control signals may include a vertical synchronization signal, a horizontal synchronization signal, and a clock signal. Additionally, or alternatively, the timing controller 350 may convert input image data to generate the image data DATA provided to the data driver 340.

The timing controller 350 may provide the generated first control signal SCS to the scan driver 310, the second control signal ECS to the light-emitting control driver 320, and the third control signal DCS to the data driver 340. The timing controller 350 may provide the generated neural network driving control signal NCS to the neural network driver 330.

The timing controller 350 may receive a neural network output voltage (or neural network output signal) from the neural network output lines NOL, and may generate the weight value control signal WCS by representing a weight value corresponding to the provided neural network output voltage. The weight value is a value trained in advance in external hardware or software, and the weight value may be a predetermined value for inference through a neural network algorithm.

Additionally, or alternatively, the timing controller 350 may provide the weight value control signal WCS to the data driver 340. The data driver 340 may provide a neural network input voltage (or neural network input signal) to the data lines DL based on the weight value control signal WCS provided from the timing controller 350. The neural network input voltage may be data in which a weight value (e.g., a weight value according to characteristic data of the display panel, logo compensation data, after-image compensation data, external sensing compensation, etc.) may be reflected to a neural network output data that may be provided from a previous horizontal line unit (or previous pixel row line unit). In the embodiment, the display device may further include a power supplier for supplying a predetermined power source to the pixel.

Hereinafter, a configuration and operation of a pixel of a display device according to an embodiment will be described with reference to FIG. 4 and FIG. 5.

Figure 4:
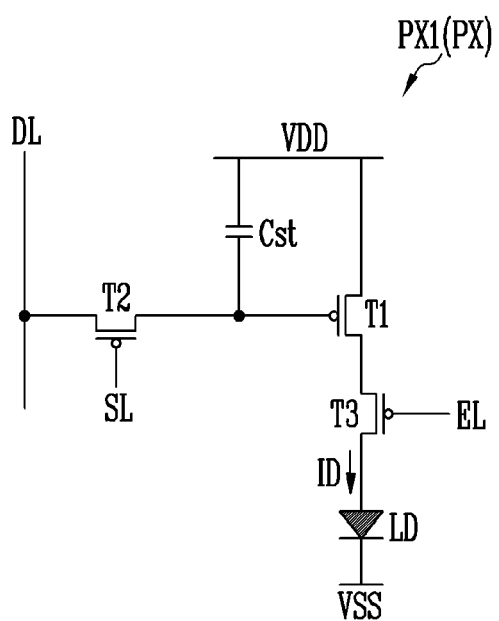
FIG. 4 and FIG. 5 illustrate circuit diagrams of one pixel of a display device according to an embodiment.
Figure 5:
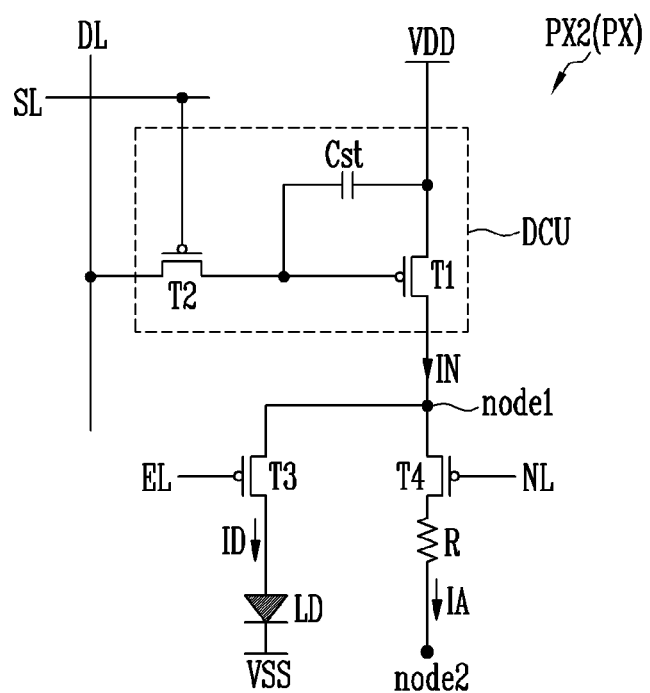

FIG. 4 and FIG. 5 illustrate circuit diagrams of one pixel of a display device according to an embodiment.

One pixel illustrated in FIG. 4 may be the first pixel PX1 of FIG. 2, and one pixel illustrated in FIG. 5 may be the second pixel PX2 of FIG. 2 and FIG. 3. However, the present disclosure is not limited thereto, and all pixels PX according to the embodiment may refer to the second pixel PX2.

Referring to FIG. 4, one pixel may include a first transistor T1, a second transistor T2, a third transistor T3, a storage capacitor Cst, and a light-emitting element LD.

Each of the first transistor T1 and the second transistor T2 includes a silicon semiconductor, for example, and may be a P-type transistor. However, the first transistor T1 and the second transistor T2 are not limited thereto, and at least one of the first transistor T1 and the second transistor T2 may include an oxide semiconductor or may be implemented as an N-type transistor.

The first transistor T1 (or driving transistor) is a transistor for driving the light-emitting element LD, and a first electrode of the first transistor T1 is connected to a first power VDD, and a second electrode of the first transistor T1 is connected to an anode electrode of the light-emitting element LD. A gate electrode of the first transistor T1 is connected to a second electrode of the second transistor T2 and to one electrode of the storage capacitor Cst.

In the embodiment, the first electrode of the first transistor T1 may be a source electrode, and the second electrode of the first transistor T1 may be a drain electrode, but the present disclosure is not limited thereto. The first transistor T1 may control an amount of a driving current ID flowing into the light-emitting element LD in response to a voltage applied to the gate electrode thereof.

The second transistor T2 (or switching transistor) is a transistor that selects the pixel PX in response to a scan signal and activates the pixel PX, and a first electrode of the second transistor T2 is connected to the data line DL, and a second electrode of the second transistor T2 is connected to the gate electrode of the first transistor T1 and to one electrode of the storage capacitor Cst. A gate electrode of the second transistor T2 is connected to the scan line SL. Accordingly, when a signal of a gate-on voltage level is supplied to the scan line SL, the second transistor T2 is turned on, and a data voltage may be transmitted from the data line DL to the gate electrode of the first transistor T1.

In the embodiment, a low-level signal is supplied to the scan line SL, and a data voltage may be applied to the data line DL at substantially equivalent timing. Accordingly, the second transistor T2 may transmit the data voltage to the gate electrode of the first transistor T1.

The third transistor T3 (or light-emitting transistor) is a light-emitting transistor that may control a light-emitting time of the light-emitting element LD, and a first electrode of the third transistor T3 is connected to the second electrode of the first transistor T1, and a second electrode of the third transistor T3 is connected to the anode of the light-emitting element LD. A gate electrode of the third transistor T3 is connected to the light-emitting control line EL. Accordingly, when a gate-on voltage level signal is supplied to the light-emitting control line EL, the third transistor T3 is turned on, and a driving current ID is applied to the anode so that the light-emitting element LD may generate light of a predetermined luminance.

The storage capacitor Cst may be formed or connected between the first power source VDD and the gate electrode of the first transistor T1. For example, one electrode of the storage capacitor Cst may be connected to the gate electrode of the first transistor T1, and the other electrode of the storage capacitor Cst may be connected to the first power source VDD. The storage capacitor Cst may store a voltage, such as a data voltage, of the gate electrode of the first transistor T1.

The anode of the light-emitting element LD is connected to the first power source VDD through the first transistor T1, and the cathode of the light-emitting element LD is connected to a second power source VSS. The light-emitting element LD may generate light of a predetermined luminance in response to an amount of current (or driving current) supplied through the first transistor T1. The light-emitting element LD may be formed as an organic light-emitting diode or an inorganic light-emitting diode such as a micro light-emitting diode (LED) and a quantum dot light-emitting diode. Additionally, or alternatively, the light-emitting element LD may be a light-emitting element complexly made of organic and inorganic materials. FIG. 4 illustrates that one pixel PX includes one light-emitting element LD, but in some embodiments, one pixel PX may include a plurality of light-emitting elements LD, and the plurality of light-emitting elements LD may be connected to each other in series, in parallel, or in series/parallel.

Referring to FIG. 5, one pixel includes a driving circuit unit DCU including at least one transistor, at least one light-emitting element LD, a third transistor T3, a fourth transistor T4, and at least one resistor R.

The driving circuit unit DCU includes the first transistor T1, the second transistor T2, and the storage capacitor Cst, which are described above. Each of the third transistor T3 and the fourth transistor T4 includes a silicon semiconductor, for example, and may be a P-type transistor. However, the third transistor T3 and the fourth transistor T4 are not limited thereto, and at least one of the third transistor T3 and the fourth transistor T4 may include an oxide semiconductor or may be implemented as an N-type transistor.

A second electrode of the first transistor T1 is connected to a first node (node 1). In the light-emitting mode, the first transistor T1 may control the driving current ID flowing into the light-emitting element LD through the third transistor T3 connected to the first node (node 1) in response to a voltage applied to the gate electrode thereof. On the other hand, in the artificial neural network mode, the first transistor T1 may control a first node current IN applied to the fourth transistor T4 connected to the first node (node 1) in response to a voltage, such as a neural network input voltage, applied to the gate electrode thereof. The first node current IN may be directly applied to the light-emitting element LD in the light-emitting mode (here, the first node current IN may be the driving current ID), and in the artificial neural network mode, the first node current IN may be directly applied to the transistor T4.

In the light-emitting mode, the second transistor T2 may transmit a data voltage for light-emitting to the gate electrode of the first transistor T1 in response to a scan signal. On the other hand, in the artificial neural network mode, the second transistor T2 may transmit a neural network input voltage (or neural network input signal) for a neural network algorithm to the gate electrode of the first transistor T1 in response to a scan signal.

In the light-emitting mode, when a data voltage is applied to one electrode of the storage capacitor Cst the storage capacitor Cst may store a voltage corresponding to a difference between the data voltage and a voltage of the first power source VDD applied to the other electrode of the storage capacitor Cst. Accordingly, in the light-emitting mode, one pixel PX may generate the driving current ID, and the driving current ID may flow into the light-emitting element LD.

The third transistor T3 (or light-emitting transistor) is a light-emitting transistor that may control a light-emitting time of the light-emitting element LD, and a first electrode of the third transistor T3 is connected to the first node (node 1), and a second electrode of the third transistor T3 is connected to the anode of the light-emitting element LD. A gate electrode of the third transistor T3 is connected to the light-emitting control line EL. Accordingly, when a gate-on voltage level signal is supplied to the light-emitting control line EL, the third transistor T3 is turned on, and a driving current ID is applied to the anode, so that the light-emitting element LD may generate light of a predetermined luminance. In a period in which the third transistor T3 is turned off, the first node current IN output from the first transistor T1 may flow into the fourth transistor T4.

The fourth transistor T4 (or neural network transistor) is a transistor driven in the artificial neural network mode, and a first electrode of the fourth transistor T4 is connected to the first node (node 1), and a second electrode of the fourth transistor T4 is connected to a second node (node 2) through at least one resistor R. A gate electrode of the fourth transistor T4 is connected to the neural network control line NL. Accordingly, when a signal of a gate-on voltage level is supplied to the neural network control line NL, the fourth transistor T4 may be turned on to generate an active current IA in response to a neural network input voltage from the first node (node 1) to the second node (node 2). For example, the fourth transistor T4 may output the active current IA by reflecting a neural network input voltage provided through the data line DL in response to a neural network control signal provided through the neural network control line NL.

The anode of the light-emitting element LD is connected to the first power source VDD through the first transistor T1 and the third transistor T3, and the cathode of the light-emitting element LD is connected to a second power source VSS. In the light-emitting mode, the light-emitting element LD may generate light of a predetermined luminance in response to an amount of current (or driving current) supplied through the first transistor T1 and the third transistor T3. On the other hand, in the artificial neural network mode, since a driving current is not applied, the light-emitting element LD may not generate light.

In the embodiment, the structure of one pixel of the display device is not limited to those shown in FIG. 4 and FIG. 5, and may be variously changed. For example, one pixel may further include at least one transistor, such as a compensation transistor for compensating a threshold voltage of the first transistor T1, an initialization transistor for initializing the gate electrode of the first transistor T1, and the like.

As described herein, a display device may thus include three transistors (e.g., T1, T2, and T3), a storage capacitor, a neural network transistor (e.g., T4) to perform a deep neural network (e.g., when some pixels of a display panel do not emit light). Such display devices may further include a current mirror circuit (ReL), and weight and input value of the front end may be input to the data line to perform calculations.

When the pixel does not emit light, since the display device according to the embodiment may use a plurality of pixels as a network of an artificial neural network, hereinafter, the artificial neural network will be described with reference to FIG. 6 and FIG. 7.

Figure 6:
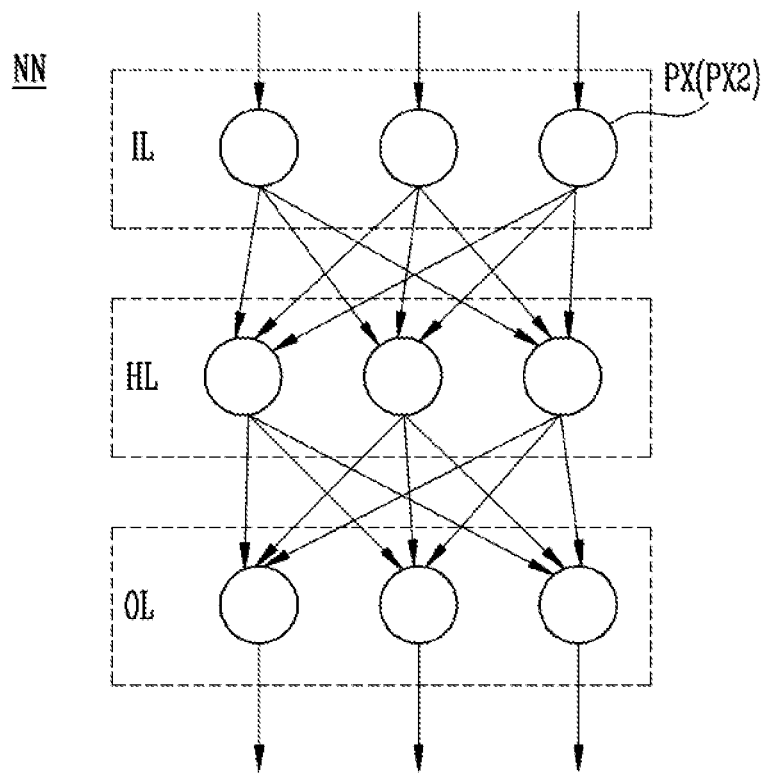
FIG. 6 and FIG. 7 illustrate schematic views of an artificial neural network implemented in a display device according to an embodiment.
Figure 7:
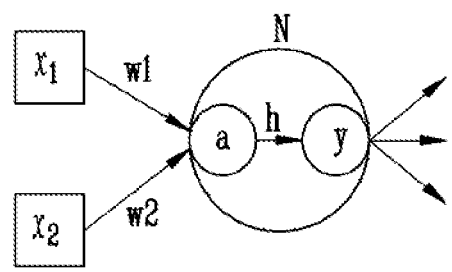

FIG. 6 and FIG. 7 illustrate schematic views of an artificial neural network implemented in a display device according to an embodiment.

An artificial neural network is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Referring to FIG. 6, when the display device according to the embodiment is driven in the artificial neural network mode, a network NN of an artificial neural network may include an input layer IL, a hidden layer HL, and an output layer OL. The input layer IL, the hidden layer HL, and the output layer OL may each include a plurality of pixels PX. Here, the plurality of pixels PX may be the aforementioned second pixels PX2.

The input layer IL and the output layer OL may each include a plurality of second pixels PX2 divided into a single horizontal line unit (or row unit), and may also each include a plurality of second pixels PX2 divided into some blocks in one horizontal line unit. For example, referring back to FIG. 2 and FIG. 3, the input layer IL and the output layer OL may each include a plurality of second pixels PX2 disposed at an h-th row (h is a natural number) and an (h+2)-th row, and may each include pixels disposed in j-th, (j+1)-th, and (j+2)-th columns (vertical line direction) among the plurality of second pixels PX2 disposed in the h-th row and the (h+2)-th row.

The hidden layer HL may include a plurality of second pixels PX2 divided into a single horizontal line unit (or row unit), and may include a plurality of second pixels PX2 divided into a plurality of horizontal line units. For example, the hidden layer HL may include pixels disposed in an i-th row (wherein I is a natural number), and may include the plurality of second pixels PX2 disposed in the i-th row, an (i+1)-th row, and a (i+2)-th row. The i-th row may represent the next row of the h-th row. Additionally, or alternatively, the hidden layer HL may include a plurality of second pixels PX2 divided into some blocks in at least one horizontal line unit. For example, among the pixels disposed in the i-th row, the pixels disposed in the j-th column (j is a natural number), the (j+1)-th column, and the (j+2)-th column may be included. When the hidden layer HL includes two or more horizontal line units of pixels, the neural network, according to the embodiment, may be called a deep neural network DNN, and learning using the deep neural network may be called deep learning.

Input data may be inputted to each input layer IL, output signals of a plurality of second pixels PX2 of the previous layer may be inputted to the hidden layer HL, and output signals of a plurality of second pixels PX2 of the previous layer may be inputted to the output layer OL. Here, the previous layer may refer to a single horizontal line unit or the second pixels PX2 divided into some blocks in a single horizontal line unit.

The second pixels PX2 respectively included in the input layer IL, the hidden layer HL, and the output layer OL may be connected to correspond to of the second pixels PX2 of the previous layer and the next layer, and in some embodiments, the second pixels PX2 respectively included in the input layer IL, the hidden layer HL, and the output layer OL may be connected to correspond to some of the second pixels PX2.

Input data inputted to the input layer IL may be transmitted to the output layer OL through the hidden layer HL, and the data may be transmitted in one direction.

A deep learning operation may refer to an operation performed via a neural network, such as a deep neural network. A deep neural network may refer to a neural network with at least one hidden layer HL between an input layer IL and an output layer OL. Generally, a deep learning operation may refer to any operation determining an output (e.g., output information, output vectors, etc.) based on input (e.g., information input, vector input, etc.) to the neural network. In some examples, such input and output may include characteristic data of the display panel, logo compensation data, after-image compensation data, external compensation data, brightness compensation data, contrast compensation data, etc. In such examples, a deep learning operation may refer to a deep neural network operation determining output from such inputs.

Referring to FIG. 7, a kind of artificial neural network algorithm executed in a display device, according to an embodiment, is presented. In the embodiment, the kind of artificial neural network algorithm of the display device is perceptron, but the present disclosure is not limited thereto.

N denotes an operation unit corresponding to one pixel in an N-th row, and x1 and x2 denote output data output from two pixels in an (N−1)-th row. W1 and w2 are weight values corresponding to two pixels in the (N−1)-th row.

When output data x1 and x2 corresponding to one pixel in the N-th row are inputted, the operation unit calculates a value of $(x_1 w_1 + x_2 w_2)$, which is a sum of a multiplication result $(x_1 w_1)$ of the output x1 and the weight w1 and a multiplication result $(x_2 w_2)$ of the output x2 and the weight w2 so as to correspond to one pixel in the N-th row. Thereafter, a bias b is added to obtain a value of $a = x_1 w_1 + x_2 w_2 + b$. Additionally, or alternatively, a value a is converted by an activation function h, and an output signal (or output data) $y = h(a)$ is output from an operation unit corresponding to one pixel in the N-th row. The output signal may be inputted to at least one pixel of the (N+1)-th row corresponding to one pixel of the N-th row. In the embodiment, the operation unit and activation function may be implemented by an active circuit.

Hereinafter, an example in which the artificial neural network algorithm described in FIG. 7 is applied to pixels positioned in the (N−1)-th, N-th, and (N+1)-th rows will be described with reference to FIG. 8 to FIG. 10.

Figure 8:
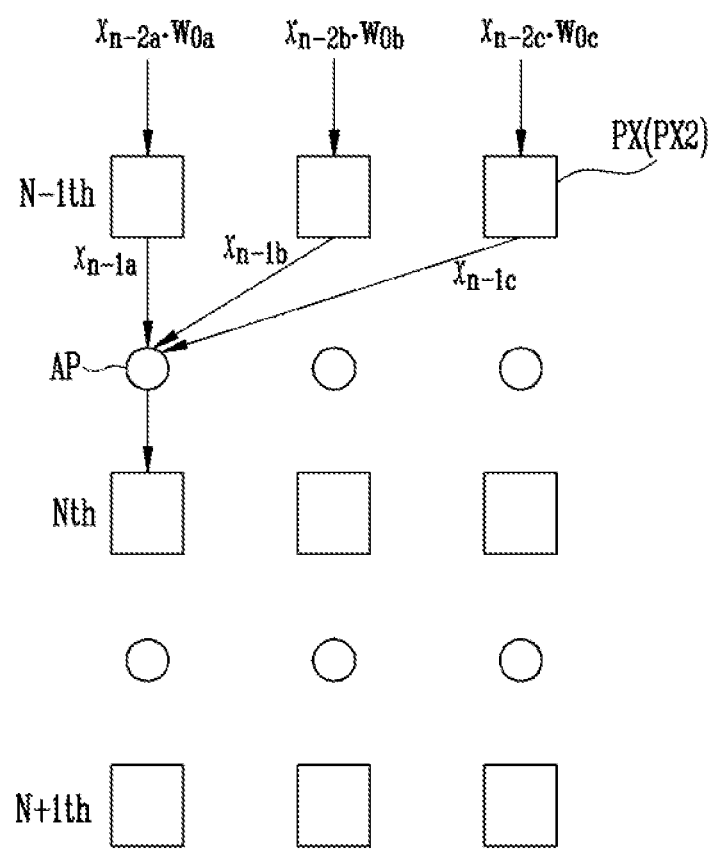
FIG. 8 to FIG. 10 illustrate schematic views of an example in which an artificial neural network algorithm is applied to pixels in a display device according to an embodiment.
Figure 9:
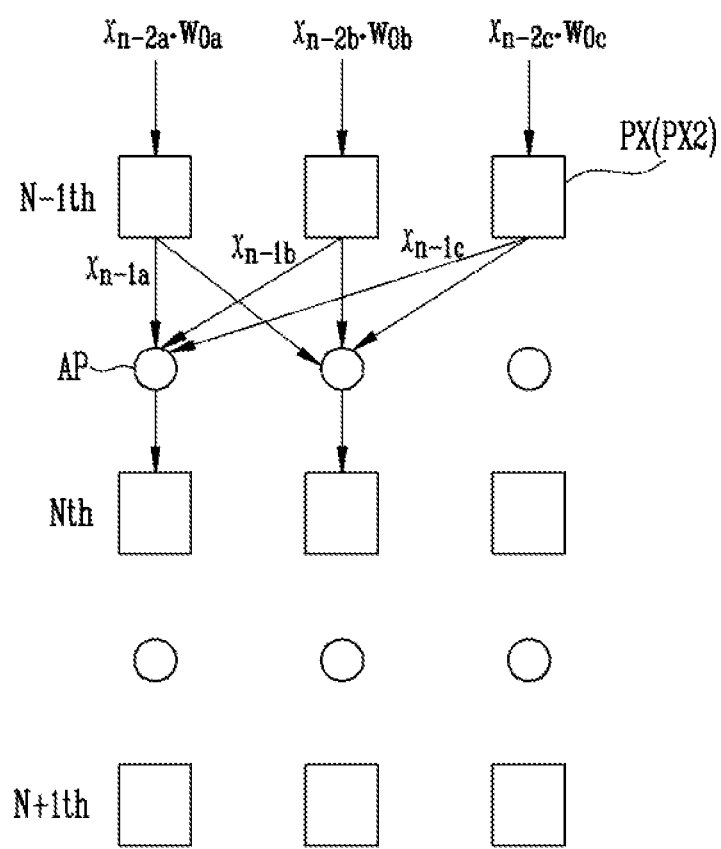
Figure 10:
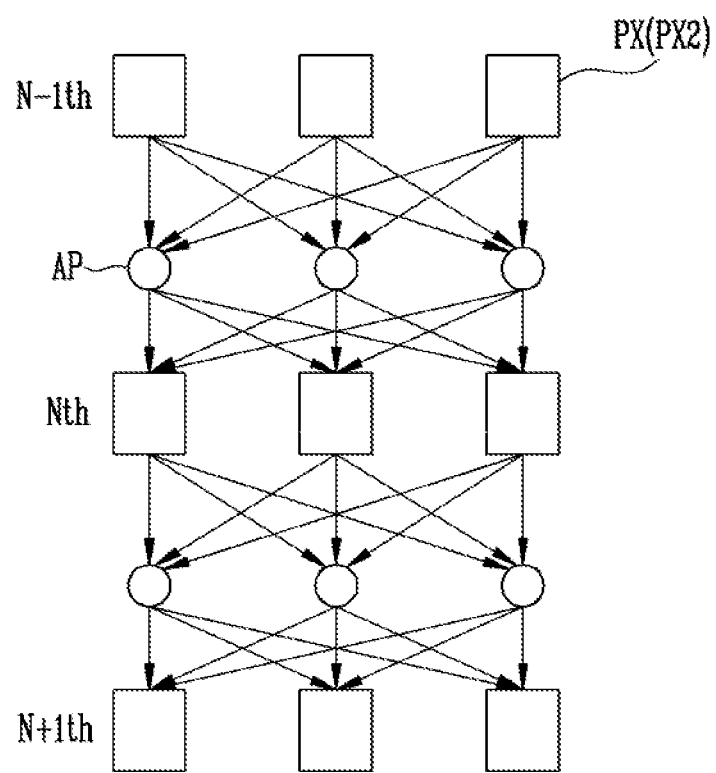

FIG. 8 to FIG. 10 illustrate schematic views of an example in which an artificial neural network algorithm is applied to pixels in a display device according to an embodiment. FIG. 8 to FIG. 10 illustrate nine pixels PX of a matrix format positioned in the (N−1)-th, N-th, and (N+1)-th rows, but in some embodiments, the arrangement form and number of the pixels are variously changed. Additionally, or alternatively, in FIG. 8 to FIG. 10, the second pixel PX2 has a rectangular shape, and an activator AP is illustrated in a circular shape, but the present disclosure is not limited thereto, and the pixel and operation unit may be implemented in various shapes.

FIG. 8 to FIG. 10 do not illustrate all wires in which three second pixels PX2 each positioned in the (N−1)-th, N-th, and (N+1)-th rows are connected to each other, but the three second pixel PX2 in the (N−1)-th row may be connected to the three second pixel PX2 in the N-th row in a ratio of 1:3, and the three second pixel PX2 in the N-th row may be connected to the three second pixel PX2 in the (N+1)-th row in a ratio of 1:3. In some embodiments, the three second pixel PX2 in the (N−1)-th row may be connected to at least one of the three second pixel PX2 of the N-th row, and the three second pixel PX2 in the N-th row may be connected to at least one of the three second pixel PX2 of the (N+1)-th row.

Referring to FIG. 8 and FIG. 9, output data and weight values of the second pixels PX2 in an (N−2)-th row corresponding to the second pixels PX2 in the (N−1)-th row are respectively inputted to the second pixels PX2 in the (N−1)-th row. Here, the output data and weight value of the second pixels PX2 of the (N−2)-th row may be a neural network input signal (or neural network input data).

The activator AP may provide the neural network input data representing the output data and weight values of the second pixels PX2 in the (N−2)-th row to the second pixels PX2 in the (N−1)-th row, respectively. For example, a value of $X_{n-2a} W_{0a}$ may be inputted to the second pixel PX2 positioned in a first column of the (N−1)-th row, a value of $X_{n-2b} W_{0b}$ may be inputted to the second pixel PX2 positioned in a second column of the (N−1)-th row, and a value of $X_{n-2c} W_{0c}$ may be inputted to the second pixel PX2 positioned in a third column of the (N−1)-th row, The second pixels PX2 in the (N−1)-th row may provide output data generated by representing the inputted output data and weight value of the second pixels PX2s in the (N−2)-th row to the activator AP. For example, data output from the second pixel PX2 in the (N−1)-th row may be Xn−1a, Xn−1b, and Xn−1c. The activator AP may reflect and add a weight value to the output data of each second pixel PX2 in the (N−1)-th row to provide the weight value as the input data of the second pixels PX2 in the N-th row.

The activator AP includes the active circuit AC and the timing controller 350 according to the embodiment shown in FIG. 1 to FIG. 5. Accordingly, the activator AP may receive the output data of the second pixels PX2 connected to the previous row, and sum the received output data of respective second pixels PX2. Additionally, or alternatively, the weight value may be reflected back to the summed value and may be output as a neural network input signal to the second pixels PX2 connected to the next row. The output data of second pixels PX2 received from the previous row may be a neural network output signal.

With the above-described method, the second pixels PX2 in the N-th row may reflect the input signals of the neural network input signals of the second pixels PX2 in the (N−1)-th row to generate output data and provide the input signals to the activator AP.

Referring to FIG. 10, the second pixels PX2 positioned in the N-th row are connected to the second pixels PX2 positioned in the (N−1)-th row and to the second pixels PX2 positioned in the (N+1)-th row, respectively.

Accordingly, the second pixels PX2 positioned in the (N−1)-th row may provide a value representing the output data and weight value to each of the second pixels PX2 positioned in the N-th row, and the second pixels PX2 positioned in the N-th row may provide a value representing the output data and weight value to each of the second pixels PX2 positioned in the (N+1)-th row In the embodiment, the output data provided by each row may be a neural network output voltage (or neural network output signal), and the value representing the output data and weight value provided from each row is a neural network input voltage (or neural network input signal).

Figure 11:
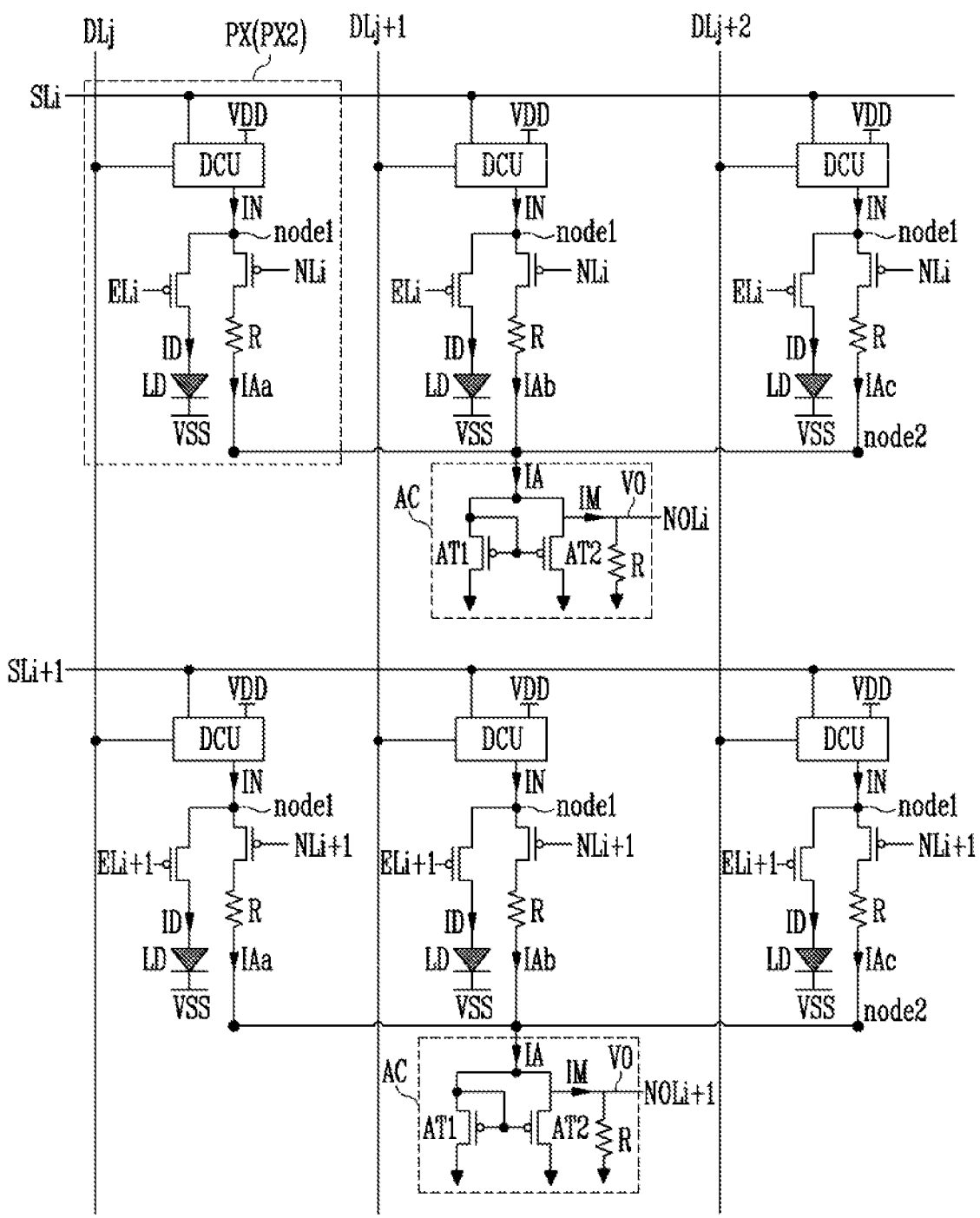
FIG. 11 illustrates a circuit diagram of an example in which a plurality of pixels are connected in a display device according to an embodiment.
Figure 12:
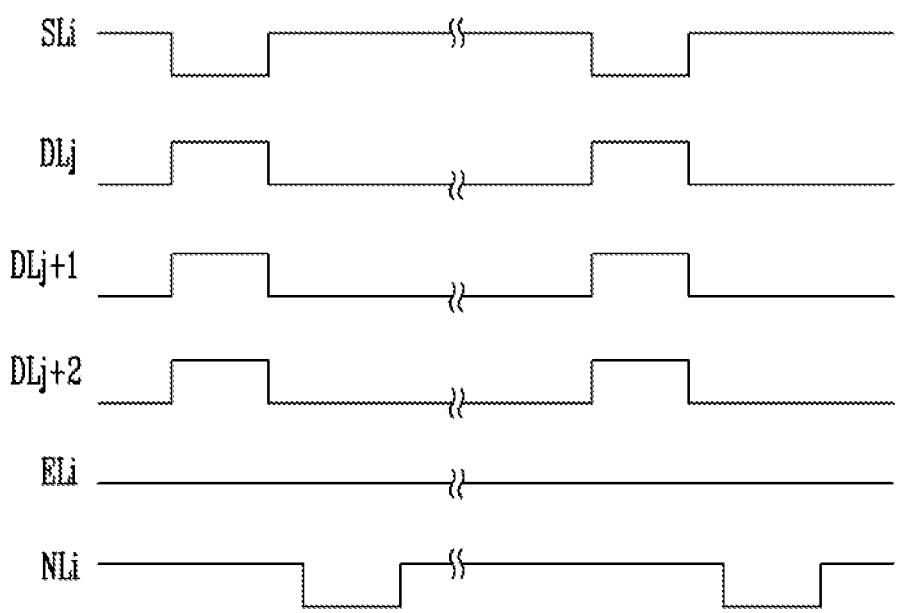
FIG. 12 illustrates a timing diagram of an example of an operation of a plurality of pixels shown in FIG. 11.

Hereinafter, a structure and operation when the artificial neural network mode is implemented in the display device according to the embodiment will be described with reference to FIG. 11 and FIG. 12. FIG. 11 illustrates a circuit diagram of an example in which a plurality of pixels are connected in a display device according to an embodiment, and FIG. 12 illustrates a timing diagram of an example of an operation of a plurality of pixels shown in FIG. 11.

Referring to FIG. 11, the display device, according to the embodiment may include the plurality of pixels PX and the active circuit AC. Each pixel PX illustrated in FIG. 12 is the second pixel PX2 of FIG. 5, and hereinafter, the pixel PX refers to the second pixel PX2. In the embodiment, the display device may be configured of the second pixel PX2.

The plurality of pixels PX positioned in the i-th row are connected to the active circuit AC through the second node (node 2). In other words, in each pixel PX, the second electrode of the fourth transistor T4 is connected to the active circuit AC through the resistor R. The active circuit AC is connected between the second node (node 2) and an output terminal VO, and the output terminal VO is connected to the neural network output line NOL.

In the present embodiment, the active circuit AC may correspond to an activation function for applying the aforementioned artificial neural network algorithm.

In the embodiment, the active circuit AC may be implemented as a current mirror circuit. The current mirror circuit includes a plurality of transistors and may supply a current with a desired current value to a desired circuit. In the present embodiment, the current mirror circuit includes two transistors AT1 and AT2, and each of the transistors AT1 and AT2 is shown to be a P-type transistor. In some embodiments, the number of transistors included in the current mirror circuit may be changed, and each transistor may be implemented as an N-type transistor.

In the active circuit AC, a first electrode and a gate electrode of the first active transistor AT1 are connected to the second node (node 2), and a gate electrode of the second active transistor AT2 is connected to the gate electrode of the first active transistor AT1 and to the first electrode the first active transistor AT1. A first electrode of the second active transistor AT2 is connected to the second node (node 2).

Driving voltages of the first and second active transistors AT1 and AT2 may be determined depending on a voltage of the second node (node 2). A current applied to the first electrode of the second active transistor AT2 may have the same value as the current applied to the first electrode of the first active transistor AT1. For example, a mirror current IM may have the same value as the active current IA. Accordingly, a voltage of the output terminal VO may be determined by a multiplied value of the active current IA and the resistance R.

The output terminal VO is connected to the neural network output line NOL, so the voltage of the output terminal VO may be provided to the timing controller 350 through the neural network output line NOL. For example, the active circuit AC may provide a neural network output voltage to the neural network output line NOL by calculating the active current IA corresponding to the plurality of pixels PX connected to the active circuit AC. Thereafter, the timing controller 350 may generate a weight value control signal WCS by representing a weight value corresponding to the provided neural network output voltage. The timing controller 350 provides the weight value control signal WCS to the data driver 340, and the data driver 340 may generate a neural network input voltage based on the weight value control signal WCS to provide the neural network input voltage through the data line DL connected to the plurality of pixels PX positioned in the (i+1)-th row.

The plurality of pixels PX positioned in the (i+1)-th row may also be driven in the same manner as the plurality of pixels PX of the i-th row described above.

An operation of the pixel PX of the i-th row connected to a data line DLj of the j-th column, a data line DLj+1 of the (j+1)-th column, and a data line DLj+2 of the (j+2)-th column will be described as an example with reference to FIG. 12.

First, when driving of the driving circuit unit DCU connected to a scan line sLi in the i-th row and to a data line DLj in the j-th column is described, a low-level scan signal is applied to the scan line sLi of the i-th row, and a neural network input voltage (or a neural network input signal) representing a weight value is applied to the data line DLj in the j-th column. Accordingly, the first node current IN is applied to the first node (node 1) through the driving circuit unit DCU.

Thereafter, when a low level neural network control signal is applied to an i-th neural network control line nLi, the fourth transistor T4 is turned on, and an active current iAa is applied to the second node (node 2) through the fourth transistor T4 and resistor R. In this case, since a high-level signal or a light-emitting control signal is not applied to a light-emitting control line eLi of the i-th row, the third transistor T3 is turned off.

An active current iAb is applied to the second node (node 2) of the pixel PX connected to the scan line sLi in the i-th row and the data line (DLj+1) in the (j+1)-th column, and an active current iAc is applied to the second node (node 2) of the pixel PX connected to the scan line sLi in the i-th row and the data line (DLj+2) in the (j+2)-th column Accordingly, the active currents IA corresponding to the pixels PX positioned in the j-th column, the (j+1)-th column, and the (j+2)-th column are summed and applied to the active circuit AC in the second node (node 2). In some embodiments, the active current IA applied to the second node (node 2) may vary depending on the number of the plurality of pixels PX connected to the active circuit AC.

The active current IA applied to the active circuit AC becomes the mirror current IM that may be the same as the active current IA, and the voltage of the output terminal VO may be determined by a multiplied value of the mirror current IM and the resistor R.

The output terminal VO is connected to the neural network output line NOL, so the voltage of the output terminal VO may be provided to the timing controller 350 through the neural network output line NOL. For example, the active circuit AC may provide a neural network output voltage to the neural network output line NOL by calculating the active current IA corresponding to the plurality of pixels PX connected to the active circuit AC.

The pixels PX connected to the scan line sLi of the i-th row and the data line DLj+1 of the (j+1)-th column and the pixels PX connected to the scan line sLi of the i-th row and the data line DLj+2 of the (j+2)-th column may also be driven in the same manner as the pixels PX connected to the scan line sLi of the i-th row and the data line DLj of the j-th column described above.

Accordingly, in the display device, according to the embodiment, when a pixel does not emit light, an operation through deep learning inference without adding a constituent element may be performed by using the pixels as a network of an artificial neural network. Therefore, a reduction in manufacturing cost of a display device may occur and a slimmer display device may be produced.

While the present disclosure has been shown and described with reference to certain embodiments thereof, it will be understood by those skilled in the art that various changes in forms and details may be made therein without departing from the spirit and scope of the present disclosure as defined by the appended claims and their equivalents.

Therefore, the technical scope of the present disclosure may be determined by on the technical scope of the accompanying claims.

What is claimed is:

1. A display device comprising:
   a display unit that includes a plurality of pixels connected to a plurality of scan lines, a plurality of data lines, a plurality of light-emitting control lines, and a plurality of neural network lines, and an active circuit connected to the plurality of pixels;
   a scan driver sequentially providing a scan signal to the plurality of scan lines;
   a light-emitting control driver sequentially providing a light-emitting control signal to the plurality of light-emitting control lines;
   a neural network driver sequentially providing a neural network control signal to the plurality of neural network lines;
   a data driver sequentially providing a data voltage or a neural network input voltage to the plurality of data lines; and
   a timing controller providing a control signal to drive each of the scan driver, the light-emitting control driver, the neural network driver, and the data driver,
   wherein the timing controller provides a weight value control signal by representing a weight value based on a neural network output voltage received from the active circuit to the data driver, and
   the data driver provides the neural network input voltage to the plurality of data lines, wherein the neural network input voltage is generated based on the weight value control signal.

2. The display device of claim 1, wherein
   the display unit is driven in a light-emitting mode in which light-emitting elements of the plurality of pixels emit light, and
   the display unit is driven in an artificial neural network mode in which the light-emitting elements of the plurality of pixels do not emit light.

3. A display device comprising:
   a plurality of pixels connected to a plurality of scan lines and a plurality of data lines;

a data driver configured to supply a data voltage to the plurality of data lines in a light-emitting mode and supply a neural network input voltage to the plurality of data lines in an artificial neural network mode; and a timing controller configured to supply a weight value control signal to the data driver in the artificial neural network mode, wherein the weight value control signal is generated based on a predetermined weight value for performing a deep learning operation using a neural network comprising at least one of the plurality of pixels, wherein the plurality of pixels emits light in the light-emitting mode and do not emit light in the artificial neural network mode, wherein the plurality of pixels includes a plurality of first pixels and a plurality of second pixels; the plurality of first pixels emit light in the light-emitting mode and the plurality of second pixels emit light in the light-emitting mode; and the plurality of second pixels performs the deep learning operation in the artificial neural network mode, wherein the display device further comprising:

an active circuit connected to the plurality of second pixels, wherein the active circuit receives an active current corresponding to the deep learning operation from the plurality of second pixels connected to the active circuit, and wherein the active circuit supplies a neural network output voltage corresponding to the active current to the timing controller.

4. The display device of claim 3, wherein
the neural network input voltage is generated based on the weight value control signal; and
the data driver provides the neural network input voltage to the plurality of data lines.

5. The display device of claim 1, wherein
the timing controller generates the weight value control signal by representing the predetermined weight value to the neural network output voltage.

6. The display device of claim 1, wherein
at least one active circuit is disposed per each pixel row in which the plurality of second pixels are disposed.

7. The display device of claim 6, wherein
the active circuit is a current mirror circuit.

8. A display device comprising:
a display unit that includes a plurality of first pixels connected to a first plurality of scan lines and a first plurality of data lines; a plurality of second pixels connected to a second plurality of scan lines, a second plurality of data lines, a plurality of light-emitting control lines, and a plurality of neural network lines; and an active circuit connected to the plurality of second pixels;
a scan driver providing a scan signal to the first plurality of scan lines and the second plurality of scan lines;
a neural network driver providing a neural network control signal to the plurality of neural network lines;
a data driver providing a data voltage or a neural network input voltage to the first plurality of data lines and the second plurality of data lines; and
a timing controller providing a control signal driving each of the scan driver, the neural network driver, and the data driver,
wherein the timing controller provides a weight value control signal by representing a weight value to the data driver,
wherein the weight value is based on a neural network output voltage received from the active circuit, and
the data driver provides the neural network input voltage to the plurality of data lines, wherein the neural network input voltage is generated based on the weight value control signal.

9. The display device of claim 8, wherein
the display unit is driven in a light-emitting mode in which light-emitting elements of the plurality of first pixels emit light and light-emitting elements of the plurality of second pixels emit light, and
the display unit is driven in an artificial neural network mode in which the light-emitting elements of the plurality of first pixels do not emit light and the light-emitting elements of the plurality of second pixels do not emit light.

10. The display device of claim 9, wherein
each of the plurality of first pixels comprises:
a first transistor comprising a first electrode connected to a first power source, a second electrode connected to an anode of a respective element of the light-emitting element of the first pixels, and a gate electrode;
a second transistor comprising a first electrode connected to a data line, a second electrode connected to the gate electrode of the first transistor, and a gate electrode connected to a scan line; and
the light-emitting element connected to the first transistor.

11. The display device of claim 9, further comprising
a light-emitting control driver sequentially providing a light-emitting control signal to a plurality of light-emitting control lines,
wherein the plurality of second pixels are each connected to the plurality of light-emitting control lines.

12. The display device of claim 11, wherein
each of the plurality of second pixels comprises:
a first transistor comprising a first electrode connected to a first power source, a second electrode connected to a first node, and a gate electrode;
a second transistor comprising a first electrode connected to a data line of the first and second plurality of data lines, a second electrode connected to the gate electrode of the first transistor, and a gate electrode connected to the scan line;
a third transistor comprising a first electrode connected to the first node, a second electrode connected to an anode of a light-emitting element, and a gate electrode connected to a light-emitting control line;
a fourth transistor comprising a first electrode connected to the first node, a second electrode connected to a second node, and a gate electrode connected to a neural network control line; and
the light-emitting element connected to the third transistor.

13. The display device of claim 12, wherein
when the display unit is in the light-emitting mode,
the second transistor transmits the data voltage to the first transistor in response to the scan signal,
the first transistor controls a driving current flowing into a respective one of the light-emitting elements of the plurality of first pixels through the third transistor in response to the data voltage, and
the light-emitting element emits light in response to the driving current supplied through the third transistor.

14. The display device of claim 12, wherein
when the display unit is in the artificial neural network mode, the second transistor transmits the neural network input voltage to the first transistor in response to the scan signal, the first transistor controls a first node current applied to the first node in response to the neural network input voltage, and the fourth transistor outputs an active current corresponding to the first node current to the second node.

15. The display device of claim 14, wherein
the active circuit is connected between the second node and an output terminal, and
the output terminal is connected to the timing controller through a neural network output line to transmit the neural network output voltage to the timing controller.

16. The display device of claim 15, wherein
the active circuit is a current mirror circuit.

17. The display device of claim 16, wherein
the active circuit is connected to at least one of a plurality of second circuits based on the second node,
the active current corresponds to at least one of the plurality of second circuits, and
the active current is applied to the second node.

* * * * *